(12) United States Patent
Shih et al.

(10) Patent No.: US 7,958,345 B2
(45) Date of Patent: Jun. 7, 2011

(54) METHOD FOR ADJUSTING SETUP DEFAULT VALUE OF BIOS AND MAIN BOARD THEREOF

(75) Inventors: Wen-Hsin Shih, Taipei (TW); Chin-Fong Pan, Taipei (TW)

(73) Assignee: Inventec Corporation, Taipei (TW)

( * ) Notice: Subject to any disclaimer, the term of this patent is extended or adjusted under 35 U.S.C. 154(b) by 738 days.

(21) Appl. No.: 11/972,386

(22) Filed: Jan. 10, 2008

(65) Prior Publication Data

US 2009/0132800 A1 May 21, 2009

(30) Foreign Application Priority Data

Nov. 16, 2007 (TW) .............................. 96143375 A (51) Int. Cl.
 *G06F 1/24* (2006.01)
 *G06F 9/00* (2006.01)
(52) U.S. Cl. ................................ 713/100; 713/2; 713/1
(58) Field of Classification Search .................... 713/100
 See application file for complete search history.

(56) References Cited

U.S. PATENT DOCUMENTS

| 5,822,581 | A  | * | 10/1998 | Christeson | 713/1 |
|---|---|---|---|---|---|
| 6,353,885 | B1 | * | 3/2002 | Herzi et al. | 713/1 |
| 6,438,687 | B2 | * | 8/2002 | Klein | 713/1 |
| 7,039,799 | B2 | * | 5/2006 | Smith et al. | 713/100 |
| 7,577,829 | B2 | * | 8/2009 | Dennis | 713/1 |
| 2006/0020844 | A1 | * | 1/2006 | Gibbons et al. | 714/2 |
| 2009/0019390 | A1 | * | 1/2009 | Su | 715/810 |

* cited by examiner

*Primary Examiner* — Suresh K Suryawanshi
(74) *Attorney, Agent, or Firm* — J.C. Patents (57) ABSTRACT

A method for adjusting setup default value of a basic input output system (BIOS) and a main board are provided. The main board offers a BIOS memory which includes a boot block and a main block. The boot block includes an adjusting table, and the main block includes an original setup default value and a dynamic table. The adjusting table is used to read the dynamic table, and the original setup default value is adjusted to be a customized setup default value according to the adjusting table and the dynamic table. Afterwards, the customized setup default value is stored in a setup value memory.

8 Claims, 5 Drawing Sheets

METHOD FOR ADJUSTING SETUP DEFAULT VALUE OF BIOS AND MAIN BOARD THEREOF

CROSS-REFERENCE TO RELATED APPLICATION

This application claims the priority benefit of Taiwan application serial no. 96143375, filed on Nov. 16, 2007. The entirety of the above-mentioned patent application is hereby incorporated by reference herein and made a part of this specification.

BACKGROUND OF THE INVENTION

1. Field of the Invention

The present invention generally relates to a method of adjusting a setup value of a basic input output system (BIOS), in particular, to a method of dynamically adjusting a default value of a BIOS and a main board thereof.

2. Description of Related Art

Each computer system has its own BIOS on a main board thereof. In a booting period, a central processing unit (CPU) on the main board will load relevant setup values of the BIOS, and then execute a boot program according to the setup values. If a user intends to modify the setup values of the BIOS, for example, the user needs a preferred boot sequence of a hard disk, an optical disk drive, network devices, or needs a preferred boot sequence of an optical disk drive, a hard disk, and a universal serial bus (USB) device, the user must enter a BIOS setup interface to modify the setup values.

Generally speaking, the setup values of the BIOS are stored in a complementary metal oxide semiconductor (CMOS) memory. During a booting period, if it is detected that no setup value is stored in the CMOS memory, or the setup values stored in the CMOS memory are invalid, the BIOS will write setup default values recorded in a BIOS memory into the CMOS memory as the setup values of the BIOS.

However, since different clients entrusting computer system manufactures may have different requirements on the setup default values, computer system manufacturers should modify the setup default values in the BIOS memory according to the requirements of different clients. As a result, computer system manufacturers need prepare several BIOS firmware versions, so as to satisfy the requirements of different clients, so the computer system manufacturers have to manage a large quantity of BIOS firmware versions. In the other aspect, each BIOS firmware version should determine whether the BIOS operates normally through a verification procedure. However, a great deal of time, equipments, and manpower must be spent to verify BIOS firmware versions, which are derived for satisfying the requirements of different clients, one by one, and meanwhile, a product development process is also elongated.

Another prior art is to write all setup default values required by all clients into the same BIOS firmware in advance, and only this single version need be verified, thereby saving the product development process. However, the prior art needs a larger memory space to store the BIOS firmware, resulting in the increase of the manufacturing cost of the product. Furthermore, if a client proposes a new requirement, another BIOS firmware is also needed to satisfy the new requirement. As a result, although the contents in the BIOS are not substantially changed at all and only the new default value is added, old users may be disturbed by continuous progressions and releases of version numbers, so this prior art is not the best policy, either.

SUMMARY OF THE INVENTION

The present invention provides a method for adjusting a setup default value of a BIOS, and the method may dynamically adjust the setup default value of the BIOS, so as to satisfy the requirements of different clients under the same BIOS version.

The present invention provides a main board. An adjusting table is stored in a boot block of a BIOS memory. An original setup default value and a dynamic table are stored in a main block. With the modifiability of the main block, usage requirements are satisfied through updating the dynamic table.

The present invention provides a method for adjusting a setup default value of a BIOS. A BIOS memory including a boot block and a main block is provided, the boot block stores an adjusting table, and the main block stores an original setup default value and a dynamic table. Firstly, the adjusting table stored in the boot block is read. Subsequently, the original setup default value stored in the main block is read. Then, the dynamic table stored in the main block is read according to the adjusting table. Afterwards, the original setup default value is adjusted according to the adjusting table and the dynamic table, so as to obtain a customized setup default value. Finally, the customized setup default value is stored in a setup value memory.

In one embodiment of the present invention, the dynamic table includes an overwrite address field and a mask field. The overwrite address field records an overwrite address to be overwritten in the setup value memory while the mask field records a mask for adjusting the original setup default value. In addition, the adjusting table includes a flag field, an overwrite value field, and a point address field. The flag field records whether to overwrite a portion of the content of the original setup default value, the overwrite value field records an overwrite value, and the point address field records a point address, so as to point to the corresponding overwrite address and the corresponding mask in the dynamic table.

In one embodiment of the present invention, before adjusting the original setup default value to obtain the customized setup default value, firstly, it is checked whether the adjusting table has at least one overwrite value, so as to determine whether to overwrite a portion of the content of the original setup default value. If the adjusting table has the overwrite value, the overwrite value is read from the adjusting table, and then the corresponding overwrite address and the corresponding mask are read from the dynamic table according to the corresponding point address of the overwrite value in the adjusting table. Then, the original setup default value is read from the BIOS memory or the setup value memory according to the overwrite address. Subsequently, the original setup default value is adjusted to be the customized setup default value according to the mask and the overwrite value.

In one embodiment of the present invention, the step of adjusting the original setup default value to be the customized setup default value according to the mask and the overwrite value includes rotating the original setup default value and the mask rightward by i bits according to the mask, in which i is an integer greater than or equal to 0. Then, AND operation is performed on the rotated original setup default value and mask, so as to obtain a first intermediate value. Then, OR operation is performed on the first intermediate value and the overwrite value, so as to obtain a second intermediate value.

Finally, the second intermediate value is rotated leftward by i bits, so as to serve as a customized setup default value. The step of rotating the original setup default value and the mask rightward by i bits according to the mask includes determining whether a lowest bit value of the mask is 0. If the lowest bit value of the mask is not 0, the mask is rotated rightward by i bits till the lowest bit value of the mask is 0, and the original setup default value is rotated rightward by i bits.

In one embodiment of the present invention, the step of storing the customized setup default value in the setup value memory includes storing the customized setup default value in the setup value memory according to the overwrite address.

The main board provided by the present invention includes a central processing unit (CPU), a setup value memory, and a BIOS memory. The setup value memory is coupled to the CPU, for storing a set of setup values. The BIOS memory is coupled to the CPU and includes a boot block and a main block. The boot block is used for storing the adjusting table. The main block is used for storing the BIOS, the original setup default value, and the dynamic table. The main board executes the BIOS with the CPU, such that the BIOS reads the dynamic table stored in the main block according to the adjusting table, so as to adjust the original setup default value, thereby obtaining the customized setup default value. Subsequently, the customized setup default value is stored in the setup value memory.

In an embodiment of the present invention, the setup value memory is a complementary metal oxide semiconductor (CMOS) memory. The BIOS memory is a non-volatile random access memory (NVRAM).

In the present invention, the boot block of the BIOS memory stores the adjusting table, and the main block stores the original setup default value and the dynamic table, such that the BIOS reads the dynamic table according to the adjusting table. Subsequently, the original setup default value is adjusted to be the customized setup default value according to the content in the adjusting table and the dynamic table. Therefore, it is quite convenient to satisfy usage requirements through updating the dynamic table under the same BIOS version.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Different clients have different requirements on the setup default values of the BIOS. Therefore, in order to satisfy the requirements of different clients, the BIOS firmware version should be often modified, which is quite inconvenient for both manufacturers and clients. Therefore, the present invention provides a method of adjusting the setup default values of the BIOS under the same BIOS version condition according to the requirements of different clients. In order to make the present invention be more comprehensible, the following embodiments are given to describe the present invention.

Those of ordinary skill in the art may realize the following embodiments by using a computer program (such as a firmware code), and store the computer program in a computer readable medium (such as EEPROM and FLASH memory) for being executed by the computer, such that the method of adjusting a setup default value of a BIOS is finished by means of electronic automation.

The First Embodiment

Figure 1:
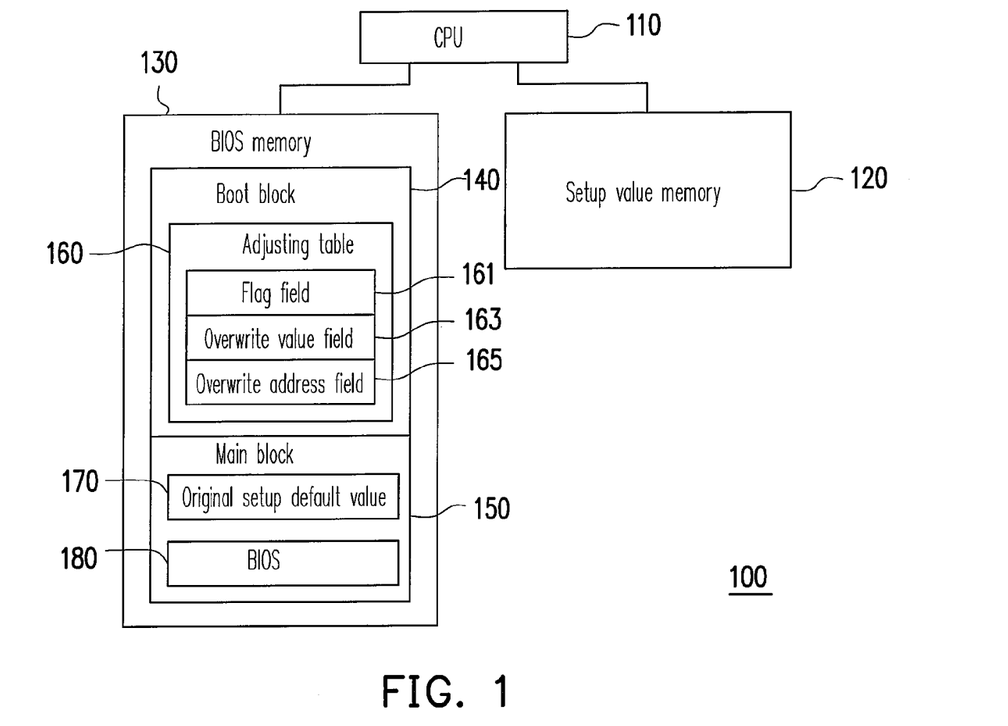
FIG. 1 is a block diagram of a main board according to a first embodiment of the present invention.

FIG. 1 is a block diagram of a main board according to a first embodiment of the present invention. Referring to FIG. 1, the main board 100 includes a CPU 110, a setup value memory 120, and a BIOS memory 130. The CPU 110 is coupled to the setup value memory 120 and the BIOS memory 130, respectively. The BIOS memory 130 includes a boot block 140 and a main block 150. The boot block 140 stores an adjusting table 160, while the main block 150 stores an original setup default value 170 and a BIOS 180. The setup value memory 120 is, for example, a complementary metal oxide semiconductor (CMOS) memory, and the BIOS memory 130 is, for example, a non-volatile random access memory (NVRAM).

The CPU 110 is used to execute the BIOS 180 in the BIOS memory 130, so that the BIOS 180 begins executing a boot program. For example, when the power of a computer system is turned on, the CPU 110 will execute the BIOS 180 to start a power on self test (POST), and then, an operating system is loaded. The setup value memory 120 is used to store a set of setup values, for the BIOS 180 to execute the boot program.

The BIOS memory 130 includes the boot block 140 and the main block 150. The boot block 140 stores the adjusting table 160 including a flag field 161, an overwrite value field 163, and an overwrite address field 165. The flag field 161 is used to record whether to overwrite a portion of the content of the original setup default value, for example, "1" means to overwrite a portion of the content of the original setup default value, and "0" means not to overwrite. The overwrite value field 163 is used to record an overwrite value to be overwritten into the original setup default value. The overwrite address field 165 is used to record the overwrite address to be overwritten in the setup value memory 120.

For example, the setup value of "boot device" in the original setup default value 170 means booting by a floppy disk drive, but a client needs to boot by an optical disk drive. Therefore, a computer system manufacture may, according to the requirement of the client, record relevant adjustment information of a customized setup default value in the adjusting table 160.

Figure 2:
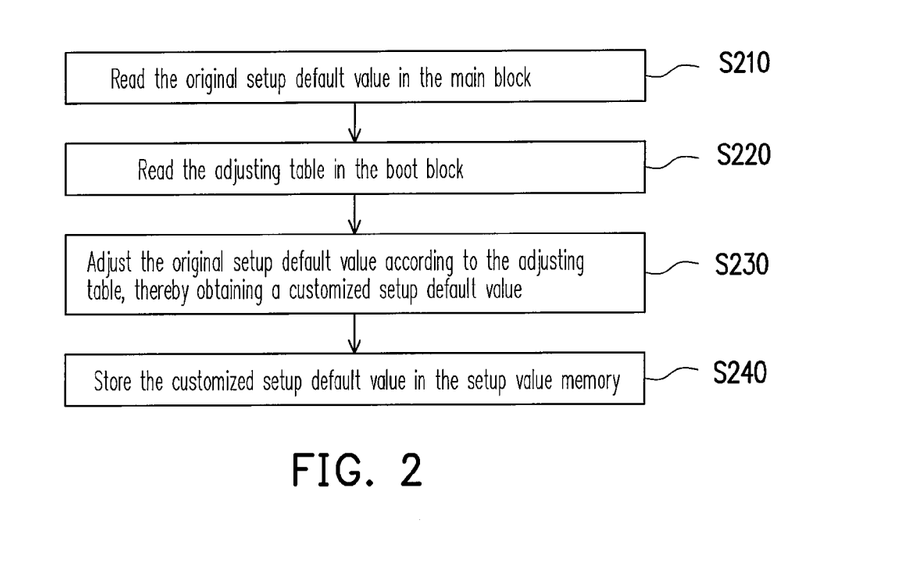
FIG. 2 is a flow chart of a method for adjusting a setup default value of a BIOS according to the first embodiment of the present invention.

The method for adjusting a setup default value of a BIOS will be illustrated in detail through describing the main board 100. FIG. 2 is a flow chart of the method for adjusting a setup default value of a BIOS according to the first embodiment of the present invention. Referring to FIGS. 1 and 2, it is assumed that, in this embodiment, the setup value memory 120 stores no set of setup values.

Firstly, when the system is being booted, as shown in Step S210, the CPU 110 starts the BIOS 180 to read the original setup default value 170 in the main block 150, and store the original setup default value 170 in the setup value memory 120.

Then, in Step S220, the BIOS 180 reads the adjusting table 160 in the boot block 140, so as to adjust the original setup default value 170. Particularly, the BIOS 180 determines whether to overwrite a portion of the content of the original setup default value 170 according to the flag field 161, i.e., determine whether an overwrite value exists in the overwrite value field 163 according to the flag field 161. When an overwrite value exists in the overwrite value field 163, it indicates that it intends to overwrite a portion of the content of the original setup default value 170. At this time, the BIOS 180 reads the overwrite address and a mask corresponding to the overwrite value in the overwrite address field 165. The mask is used to adjust a portion of bits in the overwrite address in the setup value memory 120, for example, the mask "11000111" means that the bits to be adjusted is the third, fourth, and fifth bits, and the 0th, first, second, sixth, and seventh bits will not be changed.

Subsequently, in Step S230, the BIOS 180 adjusts the original setup default value 170 according to the adjusting table 160, thereby obtaining a customized setup default value. More specifically, the BIOS 180 adjusts a portion of the content of the original setup default value 170 in the setup value memory 120 corresponding to the overwrite address according to the overwrite address, the mask, and the overwrite value obtained from the adjusting table 160, thereby obtaining the customized setup default value. Finally, as shown in Step S240, the BIOS 180 stores the customized setup default value in the setup value memory 120.

In view of the above, in the first embodiment, the BIOS 180 uses the adjusting table 160 to adjust the original setup default value 170, so the adjustment may be made in the adjusting table 160 upon a client's requirements.

The Second Embodiment

Figure 3A:
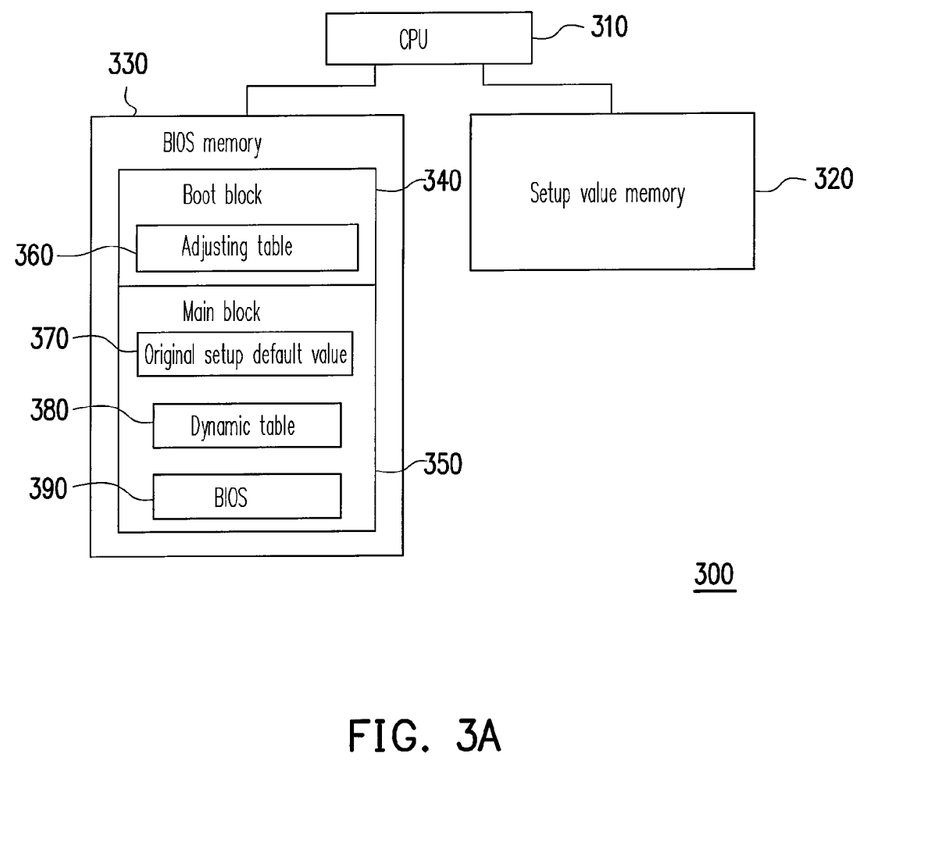
FIGS. 3A and 3B are block diagrams of a main board according to a second embodiment of the present invention.
Figure 3B:
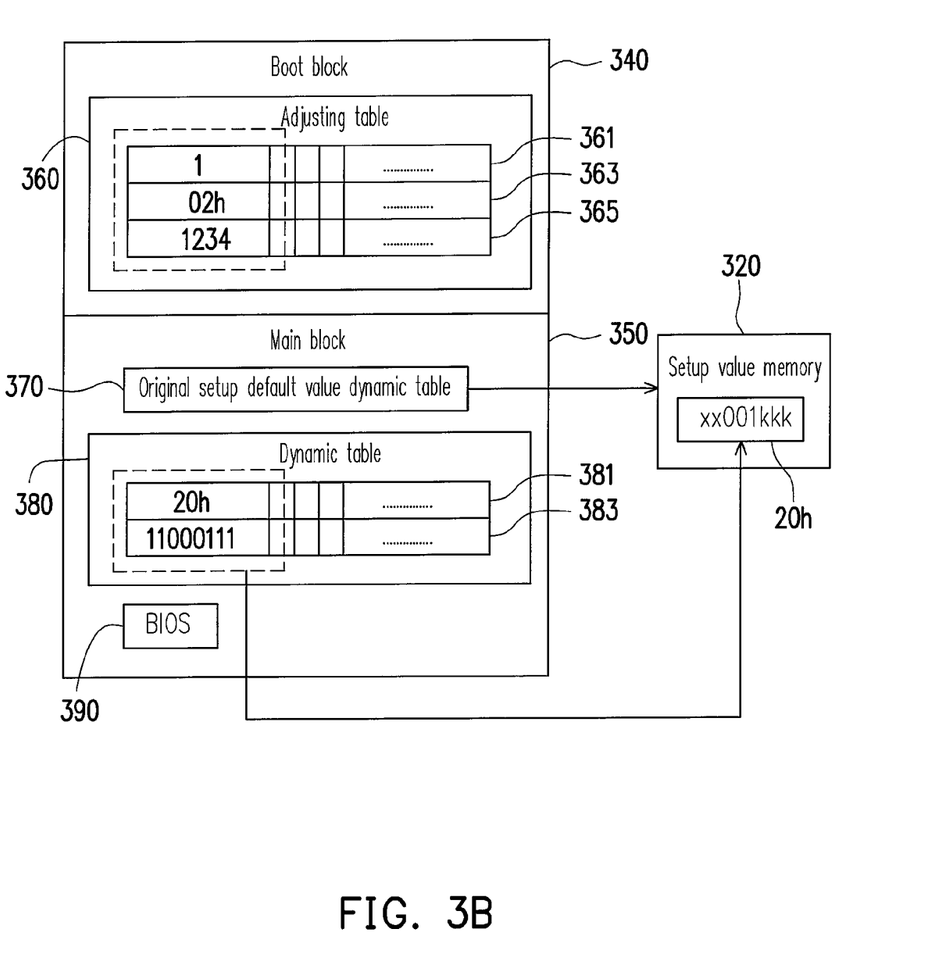

FIGS. 3A and 3B are block diagrams of a main board according to a second embodiment of the present invention. Referring to FIGS. 3A and 3B, FIG. 3B is a block diagram of a BIOS memory 330 and a setup value memory 320 of a main board 300 in FIG. 3A.

In FIG. 3A, the main board 300 includes a CPU 310, a setup value memory 320, and a BIOS memory 330. The CPU 310 is coupled to the setup value memory 320 and the BIOS memory 330 respectively. The BIOS memory 330 includes a boot block 340 and a main block 350. The boot block 340 stores an adjusting table 360, and the main block 350 stores an original setup default value 370, a dynamic table 380, and a BIOS 390.

The functions of some components of the main board 300 in this embodiment are the same as or similar to those of some components of the main board 100 in the first embodiment, and will not be repeated here. The differences lie in that, in this embodiment, the boot block 340 and the main block 350 of the BIOS memory 330 store the adjusting table 360 and the dynamic table 380, respectively. Since the boot block 340 is provided with a protection mechanism so that the data stored in the boot block 340 cannot be changed easily, in this embodiment, a dynamic table 380 is stored in the main block 350, so as to be changed at any moment upon usage requirements. The dynamic table 380 is used to store a portion of the data of the adjusting table 160 originally recorded in the first embodiment, so as to update accordingly at any moment upon usage requirements.

Subsequently, referring to FIG. 3B, the adjusting table 360 includes a flag field 361, an overwrite value field 363, and a point address field 365. The flag field 361 is used to record whether to overwrite a portion of the content of the original setup default value, the overwrite value field 363 is used to record an overwrite value, and the point address field 365 is used to record a point address, so as to point to the corresponding overwrite address and mask in the dynamic table 380.

In the other aspect, the dynamic table 380 includes an overwrite address field 381 and a mask field 383. The overwrite address field 381 records an overwrite address to be overwritten in the setup value memory 320, and the mask field 383 records a mask, so as to adjust a portion of the bits of the overwrite address in the original setup default value 370.

For example, it is assumed that the bit field of the original setup default value to be written into the setup value memory 320 is consisted of three types of values, namely, A, B, C, in which the value A is a 2-bit value, the value B is a 3-bit value, and the value C is a 2-bit value. However, a client provides the requirements that the value A is a 3-bit value, the value B is a 3-bit value, and the value C is a 2-bit value. Therefore, according to the aforementioned embodiment, a computer system manufacturer may, according to the client's requirements, record the information of the bit field in the dynamic table 380, so as to dynamically adjust the dynamic table 380, and relevant adjustment information of the customized setup default value which need not be often changed is recorded in the adjusting table 360.

Figure 4:
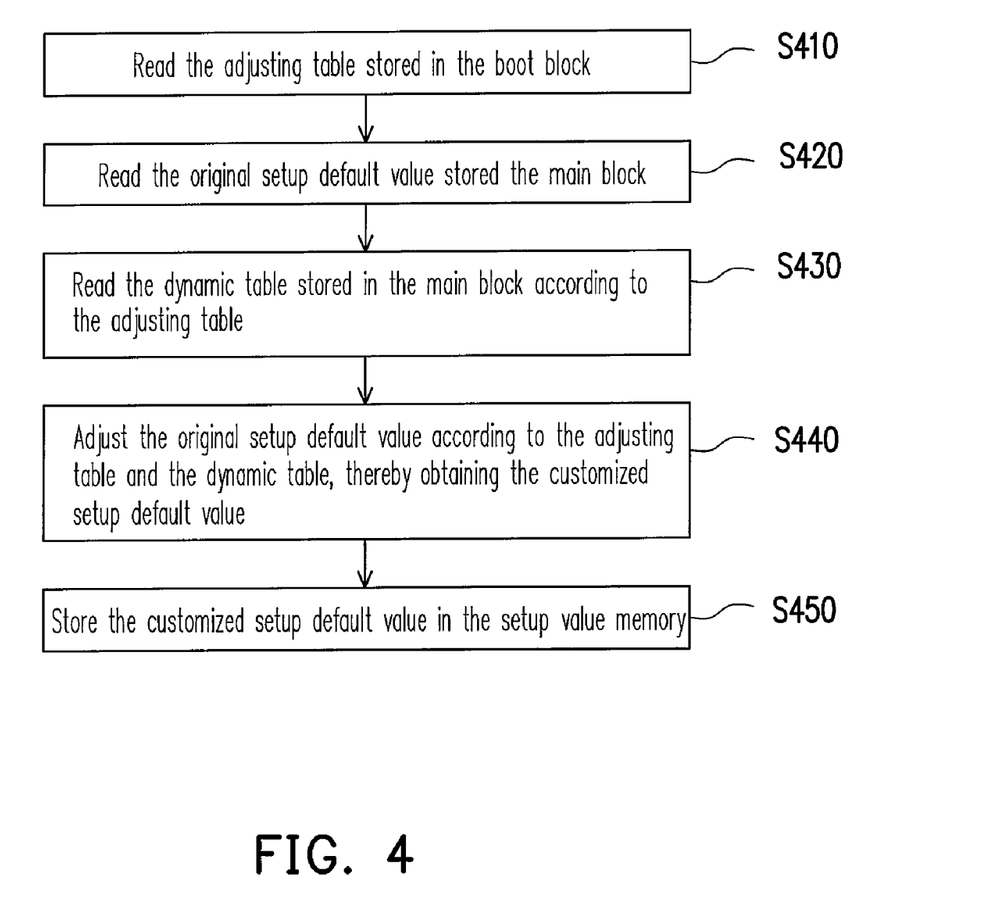
FIG. 4 is a flow chart of a method for adjusting a setup default value of a BIOS according to the second embodiment of the present invention.

In order to express the aforementioned concept more clearly, the method for adjusting a setup default value of a BIOS will be illustrated through describing the main board 300. FIG. 4 is a flow chart of the method for adjusting a setup default value of a BIOS according to the second embodiment of the present invention. Referring to FIGS. 3A and 4, firstly, in Step S410, the CPU 310 starts the BIOS 390 to read the adjusting table 360 stored in the boot block 340, so as to determine whether to adjust the original setup default value 370. More specifically, the BIOS 390 reads the overwrite value recorded in the adjusting table 360, and reads the dynamic table 380 according to the corresponding point address of the overwrite value in the adjusting table 360.

Then, when the BIOS 390 obtains the overwrite value, as shown in Step S420, the BIOS 390 reads the original setup default value 370 from the main block 350, so as to perform subsequent adjustment. More specifically, when the system is booted for the first time, the setup value memory 320 stores no setup value. Thereby, when the system is booted, the BIOS 390 reads the original setup default value 370 in the main block 350, so as to store the original setup default value 370 in the setup value memory 320.

Subsequently, in Step S430, the BIOS 390 reads the dynamic table 380 stored in the main block 350 according to the adjusting table 360. In other words, the BIOS 390 reads the corresponding overwrite address and mask in the dynamic table 380 according to the point address obtained from the adjusting table 360.

Afterwards, in Step S440, the BIOS 390 adjusts the original setup default value 370 according to the adjusting table 360 and the dynamic table 380, thereby obtaining the customized setup default value. More specifically, the BIOS 390 reads the original setup default value 370 from the setup value memory 320 according to the overwrite address obtained from the dynamic table 380. If the setup value memory 320 does not store the original setup default value 370, the BIOS 390 reads the original setup default value 370 from the BIOS memory 330 according to the overwrite address. Then, the BIOS 390 adjusts the original setup default value 370 to be the customized setup default value according to the mask and the overwrite value.

Finally, in Step S450, the BIOS 390 stores the customized setup default value in the setup value memory 320, so as to adjust the setup default value of the BIOS under the same BIOS version.

The Third Embodiment

Figure 5:
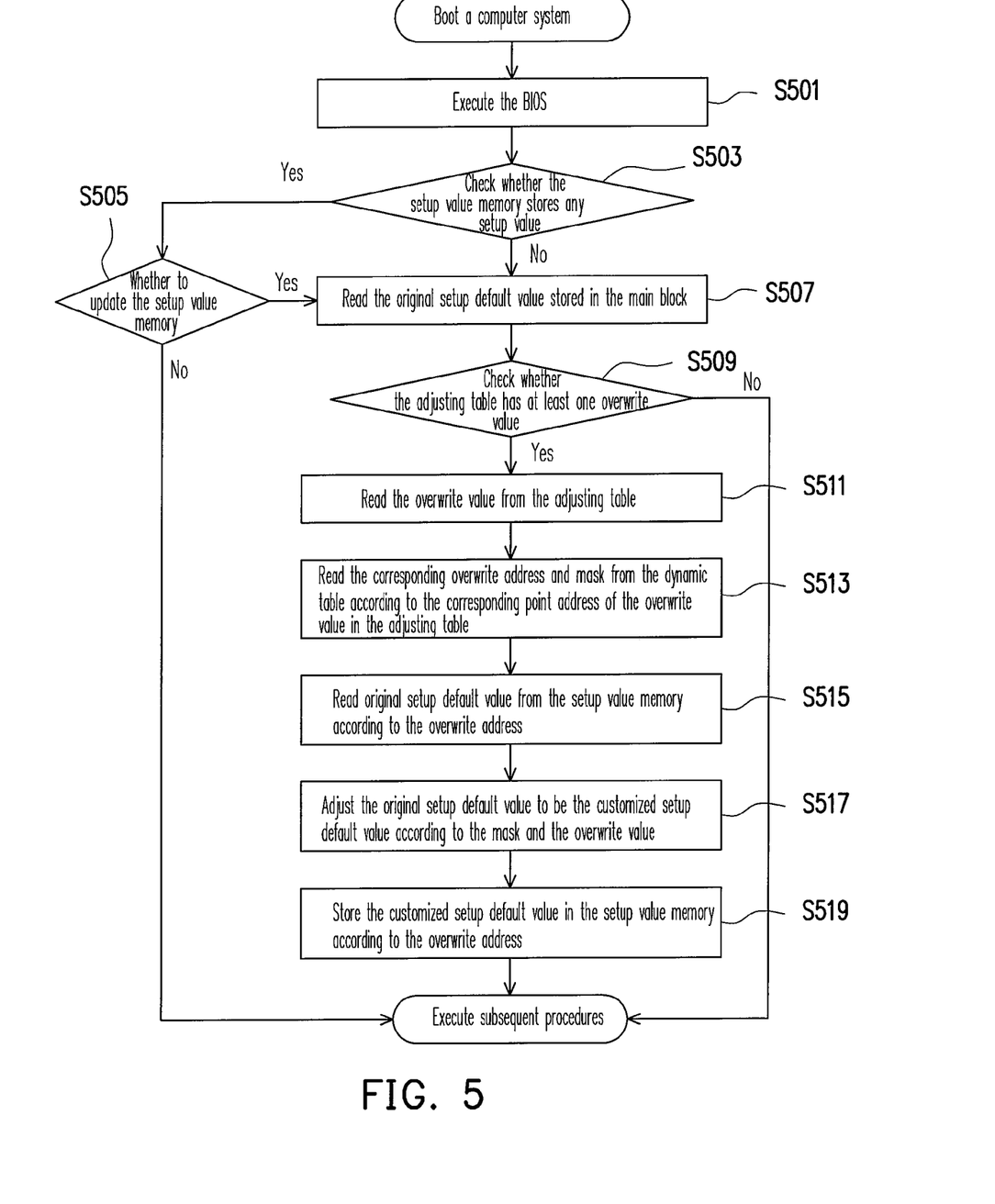
FIG. 5 is a flow chart of a method for adjusting a setup default value of a BIOS according to a third embodiment of the present invention.

FIG. 5 is a flow chart of the method for adjusting a setup default value of a BIOS according to a third embodiment of the present invention. Referring to FIGS. 3A, 3B, and 5, in this embodiment, it is assumed that the original setup default value 370 having a floppy disk drive as a "boot device" is adjusted to be the customized setup default value having an optical disk drive as the "boot device."

As a computer system is booted, as shown in Step S501, the CPU 310 executes the BIOS 390 to perform a boot program. Then, in Step S503, the BIOS 390 firstly checks whether the setup value memory 320 stores any setup value. In a practical operation, the original setup value 370 need be loaded into the setup value memory 320 under many circumstances. For example, if the computer system is booted for the first time, the setup value memory 320 stores no setup value.

If the setup value memory 320 has stored a setup value, as shown in Step S505, the BIOS 390 checks whether to update the setup value memory 320. If a user sends an instruction to update the content of the setup value memory 320, Step S507 is performed; and on the contrary, if the user does not send any instruction, the BIOS 390 directly reads the currently stored setup value from the setup value memory 320, for executing other boot programs continuously.

Then, the procedure returns to Step S503, if the setup value memory 320 stores no setup value, at this point, as shown in Step S507, the BIOS 390 reads the original setup default value 370 stored in the main block 350, and loads it into the setup value memory 320.

Then, in Step S509, the BIOS 390 checks whether the adjusting table 360 has at least one overwrite value. If the adjusting table 360 records no overwrite value, it is represented that the original setup default value 370 loaded into the setup value memory 320 need not be modified, so the boot program may be directly executed according to the original setup default value 370. On the contrary, if the adjusting table 360 has an overwrite value, Step S511 is performed, and the BIOS 390 reads the overwrite value from the adjusting table 360.

As shown in FIG. 3B, in the adjusting table 360, the flag field 361 is set as "1," indicating that the corresponding overwrite value field 363 stores the overwrite value, the overwrite value field 363 records an overwrite value "02h," and the point address field 365 records the point address "1234." In the other aspect, in the dynamic table 380, the overwrite address field 381 records an overwrite address "20h," the mask field 383 records the mask "11000111." Therefore, the BIOS 390 checks the flag field 361 to determine whether it has an overwrite value. Since the flag field 361 is set as "1," the BIOS 390 reads the overwrite value "02h" from the overwrite value field 363.

Subsequently, in Step S513, the BIOS 390 reads the corresponding overwrite address and mask from the dynamic table 380 according to the corresponding point address of the overwrite value in the adjusting table 360. In FIG. 3B, the BIOS 390 reads the corresponding overwrite address "20h" and the mask "11000111" from the address "1234" of the dynamic table 380 according to the corresponding point address "1234" of the overwrite value "02h."

Afterwards, in Step S515, the BIOS 390 reads original setup default value 370 from the setup value memory 320 according to the overwrite address. Next, as shown in Step S517, the BIOS 390 adjusts the original setup default value to be the customized setup default value according to the mask and the overwrite value.

For example, in FIG. 3B, it is assumed that the overwrite address "20h" in the setup value memory 320 is 8-bit data "xxtttkkk" (x, t, and k are binary numbers). The third, fourth, and fifth bits "ttt" in the overwrite address "20h" represent the setup value of the "boot device," and the 0th, first, and second bits "kkk" and the sixth and seventh bits "xx" represent the setup values of other functions. Furthermore, it is assumed that the setup value of the "boot device" recorded in the setup value memory 320 is "001" (i.e., it is assumed that the "boot device" of the computer system is a floppy disk drive). The setup values "000," "010," "011," and "100," of the "boot device" recorded in the setup value memory 320 represent that the "boot device" of the computer system is a network device, an optical disk drive, a hard disk, and a USB device, respectively.

Firstly, the setup values of the mask and the overwrite address are rotated rightward by i bits, in which i is an integer greater than or equal to 0. Particularly, it is determined whether the lowest bit value of the mask is 0. If the lowest bit value of the mask is not 0, the mask is rotated rightward by i bits till the lowest bit value of the mask is 0, and also the original setup default value is rotated rightward by i bits. Next, AND operation is performed on the rotated setup value and mask, so as to obtain a first intermediate value. Subsequently, OR operation is performed on the first intermediate value and the overwrite value, so as to obtain the second intermediate value. Since the setup values have been rotated rightward by i bits, the values should be rotated leftward by i bits correspondingly. Therefore, the second intermediate value is rotated leftward by i bits, so as to serve as the customized setup default value.

In FIG. 3B, the mask "11000111" and the setup value "xx001kkk" are rotated rightward by 3 bits at the same time, so as to make the lowest bit value of the mask be "0." At the end of rightward rotation, the mask becomes "11111000" and the setup value becomes "kkkxx001." Subsequently, AND operation is performed on the rotated setup value "kkkxx001" and the rotated mask "11111000," so as to obtain the first intermediate value "kkkxx000." Then, OR operation is performed on the first intermediate value "kkkxx000" and the overwrite value "02h" (i.e., binary value "00000010") from the overwrite value field 363, so as to obtain the second intermediate value "kkkxx010." Since the mask and the setup value have been rotated rightward by 3 bits, the second intermediate value "kkkxx010" is rotated leftward by 3 bits, such that the obtained "xx010kkk" serves as the customized setup default value.

Finally, in Step S519, the BIOS 390 stores the customized setup default value in the setup value memory 320 according to the overwrite address. In FIG. 3B, the customized setup default value "xx010kkk" is overwritten at the overwrite address "20h" in the setup value memory 320, thereby finishing the adjustment on the first set of setup default values in the adjusting table 360. If the flag field 361 of the adjusting table 360 indicates that there are other overwrite values, Steps S509-S519 are repeated till all overwrite values in the adjusting table 360 are all written into the setup value memory 320. Therefore, the adjustment of the setup default values of the BIOS has been finished.

In the aforementioned embodiment, the original setup default value 370 in the BIOS memory 330 is totally loaded into the setup value memory 320, and a portion of the setup value is read from the setup value memory 320 according to the adjusting table 360, so as to adjust the read setup value and obtain the customized setup default value. Finally, the customized setup default value is written back to the setup value memory 320. However, persons using the present invention may also change the aforementioned contents of the embodiments upon requirements. For example, when the original setup default value 370 in the BIOS memory 330 is loaded in the setup value memory 320, the original setup default value 370 may be adjusted in sync.

For example, in FIG. 3B, before the BIOS 390 writes the byte "xx001kkk" of the original setup default value 370 into the overwrite address "20h" in the setup value memory 320, the BIOS 390 firstly adjusts the original setup default value "xx001kkk" to be the customized setup default value "xx010kkk" according to the adjusting table 360 and the dynamic table 380, and then writes the customized setup default value "xx010kkk" into the overwrite address "20h" in the setup value memory 320.

In view of the above, in the aforementioned embodiments, the adjusting table is set in the boot block to record the overwrite value of the original setup default value to be adjusted, and the dynamic table is set in the main block to record the overwrite address of the original setup default value to be adjusted. Therefore, not only different requirements may be satisfied under the same BIOS version, but also the address field of the setup default value of the BIOS may be adjusted dynamically if necessary, which is quite convenient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for adjusting a setup default value of a basic input output system (BIOS) in a mainboard, comprising:
   providing a BIOS memory comprising a boot block and a main block, wherein the boot block stores an adjusting table, and the main block stores an original setup default value and a dynamic table;
   reading the adjusting table stored in the boot block;
   reading the original setup default value stored in the main block;
   reading the dynamic table stored in the main block according to the adjusting table, comprising:
   checking whether the adjusting table comprises at least one overwrite value, so as to determine whether to overwrite a portion of the content of the original setup default value;
   if the adjusting table comprises the overwrite value, reading the overwrite value from the adjusting table; and
   reading a corresponding overwrite address and a corresponding mask from the dynamic table according to a corresponding point address of the overwrite value in the adjusting table;
   adjusting the original setup default value to obtain a customized setup default value according to the adjusting table and the dynamic table, comprising:
   reading the original setup default value from the BIOS memory or the setup value memory according to the overwrite address; and
   adjusting the original setup default value to be the customized setup default value according to the mask and the overwrite value, comprising:
   rotating the original setup default value and the mask rightward by i bits according to the mask, wherein i is an integer greater than or equal to 0;
   performing AND operation on the rotated original setup default value and the rotated mask, so as to obtain a first intermediate value;
   performing OR operation on the first intermediate value and the overwrite value, so as to obtain a second intermediate value; and
   rotating the second intermediate value leftward by i bits, so as to serve as the customized setup default value; and
   storing the customized setup default value in a setup value memory.

2. The method for adjusting a setup default value of a BIOS according to claim 1, wherein the dynamic table comprises an overwrite address field and a mask field, the overwrite address field records an overwrite address to be overwritten in the setup value memory, and the mask field records a mask, so as to adjust the original setup default value.

3. The method for adjusting a setup default value of a BIOS according to claim 1, wherein the adjusting table comprises a flag field, an overwrite value field, and a point address field, the flag field records whether to overwrite a portion of the content of the original setup default value, the overwrite value field records an overwrite value, and the point address field records a point address, so as to point to a corresponding overwrite address and a corresponding mask in the dynamic table.

4. The method for adjusting a setup default value of a BIOS according to claim 1, wherein the step of rotating the original setup default value and the mask rightward by i bits according to the mask comprises:
   determining whether a lowest bit value of the mask is 0; and
   if the lowest value of the mask is not 0, rotating the mask rightward by i bits till the lowest bit value of the mask is 0, and rotating the original setup default value rightward by i bits.

5. The method for adjusting a setup default value of a BIOS according to claim 1, wherein the step of storing the customized setup default value in the setup value memory comprises:
   storing the customized setup default value in the setup value memory according to the overwrite address.

6. The method for adjusting a setup default value of a BIOS according to claim 1, wherein the setup value memory is a complementary metal oxide semiconductor (CMOS) memory.

7. The method for adjusting a setup default value of a BIOS according to claim 1, wherein the BIOS memory is a non-volatile random access memory (NVRAM).

8. The method for adjusting a setup default value of a BIOS according to claim 1, wherein the main block further comprises a BIOS.

* * * * *